3,058,800
CATALYTIC HYDROLYSIS OF CARBONYL SULFIDE

Ludo K. Frevel, Midland, and Leonard J. Kressley, Saginaw, Mich., assignors to The Dow Chemical Company, Midland, Mich., a corporation of Delaware
No Drawing. Filed Apr. 28, 1960, Ser. No. 25,184
3 Claims. (Cl. 23—2)

This invention relates to carbonyl sulfide, and is more particularly concerned with a new and improved process for removing gaseous carbonyl sulfide from a gas stream by catalytically hydrolyzing said carbonyl sulfide in the presence of a particular form of activated alumina.

Frequently, it is desirable to remove carbonyl sulfide from other gaseous substances; for instance, well-head petroleum and natural gases and the like usually contain sufficient amounts of carbonyl sulfide to be deemed essentially valueless for most uses until removal of carbonyl sulfide is effected. Therefore, a principal object of this invention is to provide a new and improved method for removing gaseous carbonyl sulfide from gaseous hydrocarbons. A more specific object is to provide a new and improved process for removing gaseous carbonyl sulfide from petroleum gases by utilizing prescribed reaction conditions as well as a particular form of activated alumina as catalyst.

The foregoing objects of this invention may be accomplished by passing gaseous carbonyl sulfide together with a carrying gas containing water vapor into contact with an activated alumina catalyst. Promoted by the alumina catalyst, carbonyl sulfide hydrolyzes to yield carbon dioxide and hydrogen sulfide gases in accordance with the equation:

$$COS + H_2O \rightarrow CO_2 + H_2S$$

Thereafter, the gaseous reaction products may be removed by absorption in caustic solutions or other widely known desulfurization procedures.

While carrying out the hydrolysis, the reaction temperature may vary from about 35° C. to 250° C. In general, the preferred temperature range is between about 50° C. and 250° C. for petroleum gases. The reaction has been effected with good results at atmospheric pressure but superatmospheric pressures such as those encountered in interstate natural-gas lines are satisfactory so long as the pressure does not produce liquefaction or condensation of the reaction gases.

Processes similar to that disclosed herein have heretofore required excessive quantities of water for hydrolysis; however, when utilizing the specific alumina catalyst disclosed hereinafter, it is now possible to utilize considerably less water to achieve the same results. This is particularly important since unreacted water vapor must be removed from the carrying gases in such instances as natural-gas treatment, etc. For the present process, theoretical amounts of water (equimolar amounts of water to carbonyl sulfide) provide satisfactory results and in most cases from an equimolar amount to about twice the theoretical amount of water is preferred. Larger amounts may be utilized without deleterious results; however, subsequent separation of the unreacted water does pose problems.

The particular activated alumina catalyst necessary for catalytic hydrolysis of carbonyl sulfide is hereby defined and described for purposes of the claims as a high surface area (about 20 to 300 or more square meters/gram) alkaline, activated alumina composition, said alkaline, activated alumina composition having from about ½ to about 3 percent by weight of sodium or potassium atoms affixed thereto. Such catalyst may be prepared by numerous methods; illustratively, an aqueous solution containing aluminum salts may be treated with a dilute aqueous alkali solution containing either sodium or potassium atoms until precipitation of the alumina occurs. Thereafter, the preciiptated alumina gel may be dried and roasted at temperatures from about 250° C. to about 500° C. for several hours to insure essentially complete dehydration and activation.

The manner in which gaseous carbonyl sulfide may be removed from carrying gases depends upon many factors such as the type of carrying gas, the amount of carrying gas, the relative proportion of carbonyl sulfide in the carrying gas, and the like. Usually, the carrying gas containing carbonyl sulfide will be passed through or over a bed of activated alumina or compressed into a vessel containing activated alumina. Surprisingly, it has been found that substantially all of the carbonyl sulfide may be catalytically hydrolyzed and removed from a carrying gas when the concentration of the carbonyl sulfide is 200 p.p.m. or less. Further, the carrying gas may be passed through or over the activated alumina catalyst at a rate of about 30,000 volumes of gas/volume of catalyst/hour with surprising efficiency in the carbonyl sulfide hydrolysis. Throughout extended use of the activated alumina, it has been found that the catalyst life is indefinite without noticeable loss of reactivity.

The following examples are given to more clearly describe the process, but are not to be construed as limiting the invention thereto.

EXAMPLE 1

Gaseous nitrogen, containing 1 percent by volume carbonyl sulfide, was passed at the rate of 300 milliliters/minute (1 atmosphere of pressure at 25° C.) through 17.889 grams of activated alumina, having a surface area of 200 sq. m./gram, at a temperature of about 75° C. The chemical analysis of the activated alumina was 92 percent $Al_2O_3$, 0.8 percent $Na_2O$, and 7 percent $H_2O$. Before contacting the gaseous nitrogen and carbonyl sulfide with the activated alumina catalyst, one-third of the nitrogen stream was saturated with water at 25° C. Thereafter, following contact, the gas flowing from the bed of activated alumina was analyzed and found to contain no detectable carbonyl sulfide; however, equimolar quantities of carbon dioxide and hydrogen sulfide were found to exist in the effluent gas.

EXAMPLE 2

A further determination was conducted in a manner identical to that described in Example 1 with the exception that the flow-rate of nitrogen and carbonyl sulfide was increased by a factor of nearly four (1 atmosphere of pressure at 25° C.). Once again no carbonyl sulfide was detected in the exit gas, but equimolar quantities of carbon dioxide and hydrogen sulfide were found to exist in the effluent gas.

EXAMPLE 3

Gaseous propylene, containing about 120 parts of carbonyl sulfide and 120 parts of water per million parts of propylene, was passed at rates varying from 23 to about 200 milliliters/minute (10 atmospheres of pressure at 25° C.) through 3.18 grams of activated alumina, having a composition and physical structure similar to that utilized in the above Example 1, and at a temperature of about 100° C. Upon analysis of the effluent gas, no carbonyl sulfide was detected in the effluent gas.

Various other determinations and tests, such as those described in the preceding examples, were conducted utilizing temperature ranges, catalyst configurations, rates of flow and proportions of carbonyl sulfide similar to those described hereinbefore. In all cases, satisfactory results were noted.

Comparative Example

As a means for showing the importance of alkaline alumina, propylene gas, saturated with water an dcontaining 120 parts of carbonyl sulfide per million parts of propylene, was passed through 13.0 grams of acidified, activated alumina, having a surface area of 350 sq.in./gm., at a rate of 150 milliliters/minute (1 atmosphere of pressure at 25° C.) and at a temperature of about 100° C. The chemical analysis of the acidified activated alumina catalyst was 85 percent $Al_2O_3$, 2 percent $Na_2O$ and 6.4 percent water with 6.3 percent $SiO_2$ admixed therein. The gas flowing from the bed of acidified, activated alumina was analyzed and found to contain 75 p.p.m. carbonyl sulfide; moreover, reduction of the flow rate to 50 milliliters/minute merely provided a marginal reduction of carbonyl sulfide in the effluent gas stream amounting to 25 p.p.m. When the flow-rate was again increased to 150 milliliters/minute and dry hydrogen chloride gas introduced into the incoming gas stream, the effluent contained 160 p.p.m. of unreacted carbonyl sulfide for a short interval (about 10 minutes) and thereafter the amount of carbonyl sulfide gradually diminished to equal the amount (120 p.p.m.) contained in the propylene. This clearly indicated that the chemisorbed carbonyl sulfide was liberated by the hydrogen chloride gas and then physically adsorbed toward the exit of the catalyst bed.

Various modifications may be made in the present invention, but it is to be understood that we limit ourselves only by the claims enumerated hereafter.

We claim:

1. The process which comprises passing gaseous carbonbonyl sulfide and water carried in a gas selected from the group consisting of nitrogen and gaseous hydrocarbons into contact with an alkaline, activated alumina catalyst, having from about 0.15 to about 3.0 percent by weight of alkali atoms selected from the group consisting of sodium and potassium affixed thereon, at a temperature between about 35° C. and about 250° C. whereby the carbonyl sulfide and water are reacted to produce carbon dioxide and hydrogen sulfide.

2. The process which comprises passing gaseous carbonbonyl sulfide and water carried in a gas selected from the group consisting of nitrogen and gaseous hydrocarbons, the quantity of said water being at least equimolar with the molar quantity of carbonyl sulfide, into contact with an alkaline, activated alumina catalyst, having from about 0.15 to about 3.0 percent by weight of alkali atoms selected from the group consisting of sodium and potassium affixed thereon, at a temperature between about 35° C. and about 250° C. whereby the carbonyl sulfide and water are reacted to produce carbon dioxide and hydrogen sulfide.

3. The process which comprises passing gaseous carbonyl sulfide and water together with a hydrocarbon carrying gas therefor into contact with an alkaline, activated alumina catalyst, having from about 0.15 to about 3.0 percent by weight of alkali atoms selected from the group consisting of sodium and potassium affixed thereon, at a temperature between about 35° C. and about 250° C. whereby the carbonyl sulfide and water are reacted to produce carbon dioxide and hydrogen sulfide.

References Cited in the file of this patent

UNITED STATES PATENTS

| | | |
|---|---|---|
| 1,710,141 | Benner et al. | Apr. 23, 1929 |
| 2,149,039 | Benning et al. | Feb. 28, 1939 |
| 3,000,988 | Karchmer et al. | Sept. 19, 1961 |